US012443654B2

(12) United States Patent
Kedarisetti et al.

(10) Patent No.: US 12,443,654 B2
(45) Date of Patent: Oct. 14, 2025

(54) SEARCHABLE VIDEO WITH BINARY VECTORS

(71) Applicant: MOTOROLA SOLUTIONS, INC., Chicago, IL (US)

(72) Inventors: Dharanish Kedarisetti, Woburn, MA (US); Yanyan Hu, Andover, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 82 days.

(21) Appl. No.: 18/096,234

(22) Filed: Jan. 12, 2023

(65) Prior Publication Data

US 2024/0241908 A1    Jul. 18, 2024

(51) Int. Cl.
*G06F 16/732* (2019.01)
*H04N 19/94* (2014.01)

(52) U.S. Cl.
CPC .......... *G06F 16/732* (2019.01); *H04N 19/94* (2014.11)

(58) Field of Classification Search
CPC combination set(s) only.
See application file for complete search history.

(56) References Cited

U.S. PATENT DOCUMENTS

| | | | |
|---|---|---|---|
| 6,892,193 B2 | 5/2005 | Bolle et al. | |
| 8,564,661 B2 | 10/2013 | Lipton et al. | |
| 9,195,883 B2 | 11/2015 | Brewer et al. | |
| 9,224,044 B1 | 12/2015 | Laska et al. | |
| 9,602,738 B2 | 3/2017 | Choe et al. | |
| 9,779,307 B2 | 10/2017 | Laska et al. | |
| 10,482,336 B2 | 11/2019 | Burge et al. | |
| 10,642,891 B2 | 5/2020 | Choe et al. | |
| 11,170,215 B1* | 11/2021 | Sieracki | G06V 10/44 |
| 2014/0050356 A1 | 2/2014 | Bobbitt et al. | |
| 2018/0157939 A1* | 6/2018 | Butt | G06V 10/454 |
| 2019/0073520 A1* | 3/2019 | Ayyar | G06V 40/173 |
| 2021/0012509 A1* | 1/2021 | Fujimoto | G06T 3/40 |
| 2021/0303823 A1* | 9/2021 | Iio | G06F 18/22 |
| 2023/0142455 A1* | 5/2023 | Nakao | G06N 20/00 706/12 |
| 2023/0306056 A1* | 9/2023 | Lee | G06F 16/783 |

FOREIGN PATENT DOCUMENTS

| | | |
|---|---|---|
| CA | 2814401 C | 12/2013 |
| JP | 2019101927 A | 6/2019 |

OTHER PUBLICATIONS

Purdy, Scott. "Encoding data for HTM systems." arXiv preprint arXiv:1602.05925, Numenta, Inc, Redwood City, California, United States, Feb. 18, 2016, available at https://arxiv.org/ftp/arxiv/papers/1602/1602.05925.pdf.

(Continued)

*Primary Examiner* — Richard L Bowen
(74) *Attorney, Agent, or Firm* — PERRY + CURRIER INC. (FOR MSI)

(57) ABSTRACT

An event detected in video is encoded as a binary vector. A set of binary vectors representative of the video may be so generated and stored in a queryable datastore. A query is encoded as a binary vector representative of a queried event. The query binary vector is compared to the set of binary vectors generated for the video and a result indicative of a similarity of the query binary vector to the set of binary vectors is returned.

15 Claims, 9 Drawing Sheets

(56) References Cited

OTHER PUBLICATIONS

PCT/US2023/081870, Searchable Video with Binary Vectors, Nov. 30, 2023.

Chaisorn, Lekha et al. "A bitmap indexing approach for video signature and copy detection." 2010 5th IEEE Conference on Industrial Electronics and Applications. IEEE, 2010.

Lee, Vincent T., et al. "Application codesign of near-data processing for similarity search." 2018 IEEE International Parallel and Distributed Processing Symposium (IPDPS). IEEE, 2018.

Prakhya, Sai Manoj et al. "B-SHOT: A binary feature descriptor for fast and efficient keypoint matching on 3D point clouds." 2015 IEEE/RSJ international conference on intelligent robots and systems (IROS). IEEE, 2015.

Shrestha, Buddha et al. "Temporal querying of faces in videos using bitmap index." 2019 IEEE Conference on Multimedia Information Processing and Retrieval (MIPR). IEEE, 2019.

* cited by examiner

| WEEK 720 | | | | | | |
|---|---|---|---|---|---|---|
| MON | TUE | WED | THU | FRI | SAT | SUN |
| 001 | 111 | 100 | 000 | 000 | 000 | 000 |

←—722

| | | | | | | |
|---|---|---|---|---|---|---|
| 000 | 111 | 110 | 000 | 000 | 000 | 000 |

←—724

| | | | | | | |
|---|---|---|---|---|---|---|
| 000 | 011 | 111 | 000 | 000 | 000 | 000 |

←—726

| | | | | | | |
|---|---|---|---|---|---|---|
| 011 | 111 | 000 | 000 | 000 | 000 | 000 |

| DAY 730 | | | | | | |
|---|---|---|---|---|---|---|
| 12 AM | 1 AM | 2 AM | ... | 9 PM | 10 PM | 11 PM |
| 000000 | 000000 | 000000 | ... | 000000 | 111111 | 000000 |

←—732

| | | | | | | |
|---|---|---|---|---|---|---|
| 000000 | 000000 | 000000 | ... | 000000 | 000111 | 111000 |

←—734

| | | | | | | |
|---|---|---|---|---|---|---|
| 000000 | 000000 | 000000 | ... | 011111 | 100000 | 000000 |

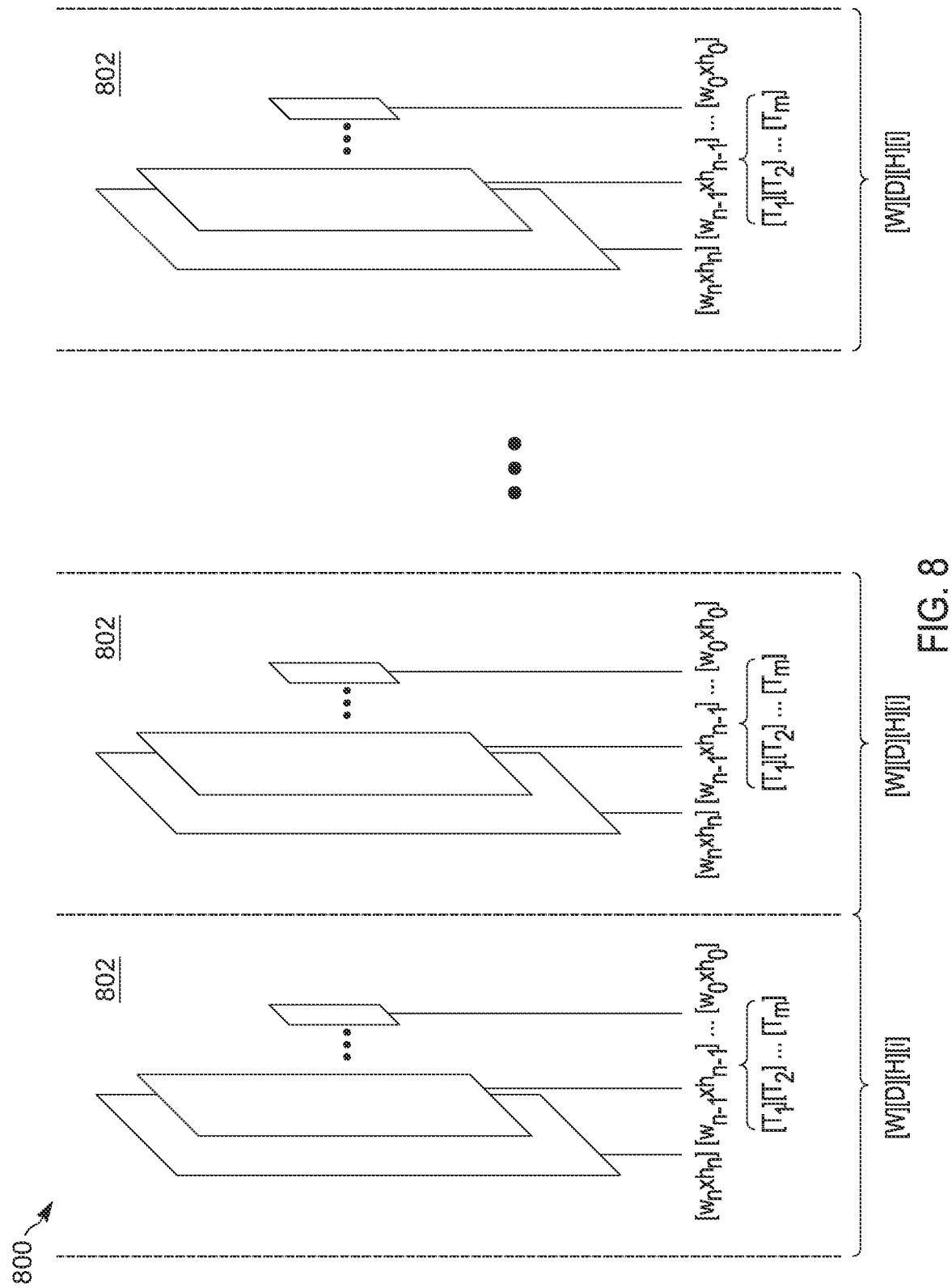

SEARCHABLE VIDEO WITH BINARY VECTORS

BACKGROUND

Video is a rich medium that can convey a tremendous amount of information. Video may be used for security, entertainment, and other purposes. For security purposes, video may be captured by fixed-position cameras that are aimed at a scene of interest.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 7B is a schematic diagram of another example timestamp encoding showing an example of day-of-week encoding.

FIG. 7C is a schematic diagram of the timestamp encoding of FIG. 7B showing an example of hour encoding.

FIG. 8 is a schematic diagram of example binary vector encoding for events of a video.

Figure 1:
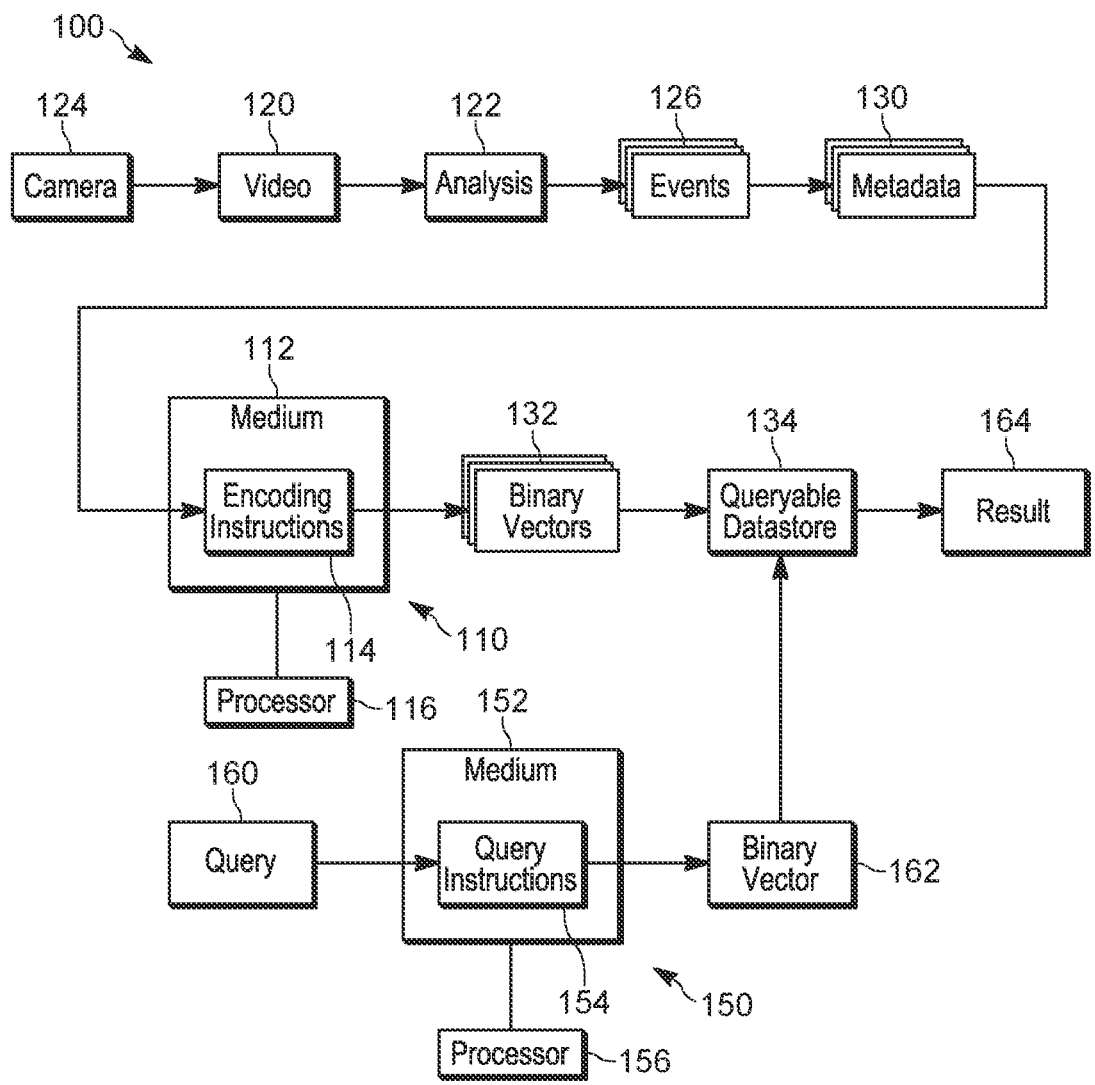
FIG. 1 is a block diagram of an example system for creating searchable video and responding to queries using binary vectors.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Video's richness also makes it difficult to search. While searching can be improved by analyzing metadata describing events in a video, a user is often left to scrub through the video to identify events of interest. Rules engines are known to be used, but these often require specialized training. This is particularly the case when the user wishes to find events that are similar to a known event.

The techniques disclosed herein encode events of a video as binary vectors, which may accord to a one-hot encoding or other type of encoding. This simplifies similarity computations and thus makes searching a video more efficient and further enhances the capabilities of what may be searched.

In accordance with an example embodiment, a non-transitory machine-readable medium includes instructions that, when executed by a processor, cause the processor to receive metadata describing an event that is detected within video captured by a camera, encode the event as a binary vector, generate a set of binary vectors representative of the video including the binary vector encoding the event, and store the set of binary vectors in a queryable datastore.

In accordance with another example embodiment, a non-transitory machine-readable medium includes instructions that, when executed by a processor, cause the processor to receive a query to find an event within video, encode the query as binary vector representative of the event, compare the binary vector to a set of binary vectors generated for the video to find similar events, and return a result indicative of a similarity of the binary vector to the set of binary vectors.

In accordance with another example embodiment, a non-transitory machine-readable medium includes instructions that, when executed by a processor, cause the processor to generate a set of binary vectors representative of events detected within video. Each binary vector is associated with a spatial dimension, a temporal dimension, or the spatial and temporal dimensions of the video.

The above-mentioned embodiments will be discussed in more detail below, starting with example system and device architectures of the system in which the embodiments may be practiced, followed by an illustration of processing blocks for achieving an improved technical method, device, and system for searching video with binary vectors.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

FIG. 1 illustrates an example system 100 for creating searchable video and responding to queries using binary vectors. The system 100 may be implemented as an encoding subsystem 110 and a query subsystem 150.

The encoding subsystem 110 is implemented with a non-transitory machine-readable medium 112 including encoding instructions 114 that are executable by a processor 116.

Video 120 is generated and undergoes analysis 122. Video 120 may be captured by a camera 124, such as a security camera, and may take the form of a video file or video stream. Analysis 122 may include detecting objects and related information in the video 120, such as face detection, face identification, person detection, vehicle detection, movement detection, etc., and classifying such as events 126. The analysis 122 generates metadata 130 that describes any number of events 126 that occur within the video 120.

Devices for capturing and processing video 120 as discussed above to generate metadata 130 are available from Avigilon Corporation. Relates techniques are described in U.S. Pat. Nos. 10,642,891, 8,564,661, 9,195,883, and 9,602,738, which are incorporated herein by reference.

In general, video 120 captured by a camera or other recording device may be analyzed semantically to detect objects, actions, events, and groups of events.

As an example, activities in a video scene may be classified (e.g., based on complexity) into four categories. (1) basic action, (2) action, (3) event, and (4) grouped event. A basic action may involve a single agent performing simple activities or gestures (e.g., walk, run, stop, turn, sit, bend, lift hands, etc.). The action may be a single agent interacting with a single subject (e.g., carry a box, open door, disembark from a car, etc.). Both the agent and the subject may be described herein generally as "objects." An event may be described as a single or multiple agents interacting with a single or multiple subjects (e.g., Person_1 passes a ball to Person_2). A grouped event may include a plurality of events occurring concurrently or sequentially (e.g., Human_1 disembarks from a Vehicle_2, meets Human_3, takes a bag_4 from Human_3, and then Human_3 walks away and Human_1 rides Vehicle_2 and leaves the scene).

The term "event" as used herein may specifically refer to a simple event, for example including only one or two objects and a single action, or may refer to a complex event, such as a grouped event including a plurality of simple events occurring, for example, simultaneously and/or sequentially. Events need not be specific actions or occurrences and may simply be what the video contains, as described by metadata.

As such, video 120 may be analyzed to determine scene elements, to recognize actions, and to extract contextual information, such as time and location, in order to detect events 126. The various events 126 may be represented by metadata 130.

The encoding instructions 114 receive metadata 130 that describes an event 126 and then encode the event 126 as a binary vector 132. A binary vector 132 is a sequence of bits (e.g., 01010100) and may be termed a bit array or bit vector.

The encoding instructions 114 encode binary vectors 132 for a set of events 126 described by metadata 130 to generate a set of binary vectors 132 representative of the video 120. This may be done for a complete video, such as a video file, in which case the metadata 130 and binary vectors 132 may describe the entire video file. This may also be done for a video stream, in which case the metadata 130 is received at intervals or in real time and the binary vectors 132 are generated as metadata 130 is received.

The encoding instructions 114 may encode binary vectors 132 at specific intervals of the video 120. That is, metadata 130 for events 126 may be accumulated over an interval and then a binary vector 132 may be encoded for that interval. This reduces the amount of binary vectors 132 generated for sake of efficiency. For example, metadata 130 may be at the resolution of one second, so that for each second of video, a respective instance of metadata 130 describes events 126 occurring during that second. The interval for a binary vector 132 may be longer than the timescale of metadata 130. Examples of suitable intervals include 10 seconds, 30 seconds, 60 seconds, 90 seconds, and 120 seconds. Shorter intervals mean a greater amount of binary vectors 132 will be generated. If a large amount of binary vectors 132 is tolerable, then a shorter interval will provide query results with greater precision. If storage usage is to be reduced, then a longer interval may be used provided that the loss in precision is acceptable to the user. An appropriate interval for binary vector generation to account for the temporal dimension of the video 120 may be selected based on implementation requirements.

The encoding instructions 114 store the set of binary vectors 132 in a queryable datastore 134. In the case of a video stream, binary vectors 132 descriptive of the video stream may be accumulated at the queryable datastore 134 as they are generated.

The query subsystem 150 is implemented with a non-transitory machine-readable medium 152 including query instructions 154 that are executable by a processor 156.

The processors 116, 156 may represent different physical processors or the same physical processor. Likewise, the media 112, 152 may represent different physical media or the same physical medium. In some implementations, the encoding subsystem 110 and query subsystem 150 are implemented together at the same computing device, in which case the processors 116, 156 may be the same physical processor and the media 112, 152 may be the same physical medium. In other examples, the encoding subsystem 110 and query subsystem 150 are implemented separately at different computing devices that may be connected via a network, in which case the processors 116, 156 are different physical processors and the media 112, 152 are different physical media.

A user may wish to find an event 126 within the video 120. Rather than manually scrubbing through the video 120 to visually find the event 126, the user may construct a query 160 for the event 126 and provide the query 160 to the query subsystem 150.

The query 160 may be expressed in various forms and may be human intelligible. A query language or graphical user interface (GUI) may be used to generate the query 160. The query may have the same format as the metadata 130.

The query instructions 154 receive the query 160 to find the event 126 within the video 120 and encode the query 160 as binary vector 162 representative of the event 126.

The query instructions 154 then apply the query 160 by comparing the binary vector 162 representing the query 160 to the set of binary vectors 132 generated for the video 120. The query instructions 154 compare the query binary vector 162 to the set of binary vectors 132 to determine similarity. Similarity may be determined by computing a dot product of the query binary vector 162 with each of the binary vectors 132. A higher dot product indicates a greater similarity. Other similarity computations may be used, such as an XNOR operation, Euclidian distance between vectors, and similar.

The query instructions 154 then return a result 164 indicative of the similarity of the binary vector 162 to the set of binary vectors 132. The result 164 may include intervals or snippets of video that represented by binary vectors 162 that are similar to the query binary vector 162. Multiple results 164 may be provided and may be ranked based on similarity.

Figure 2:
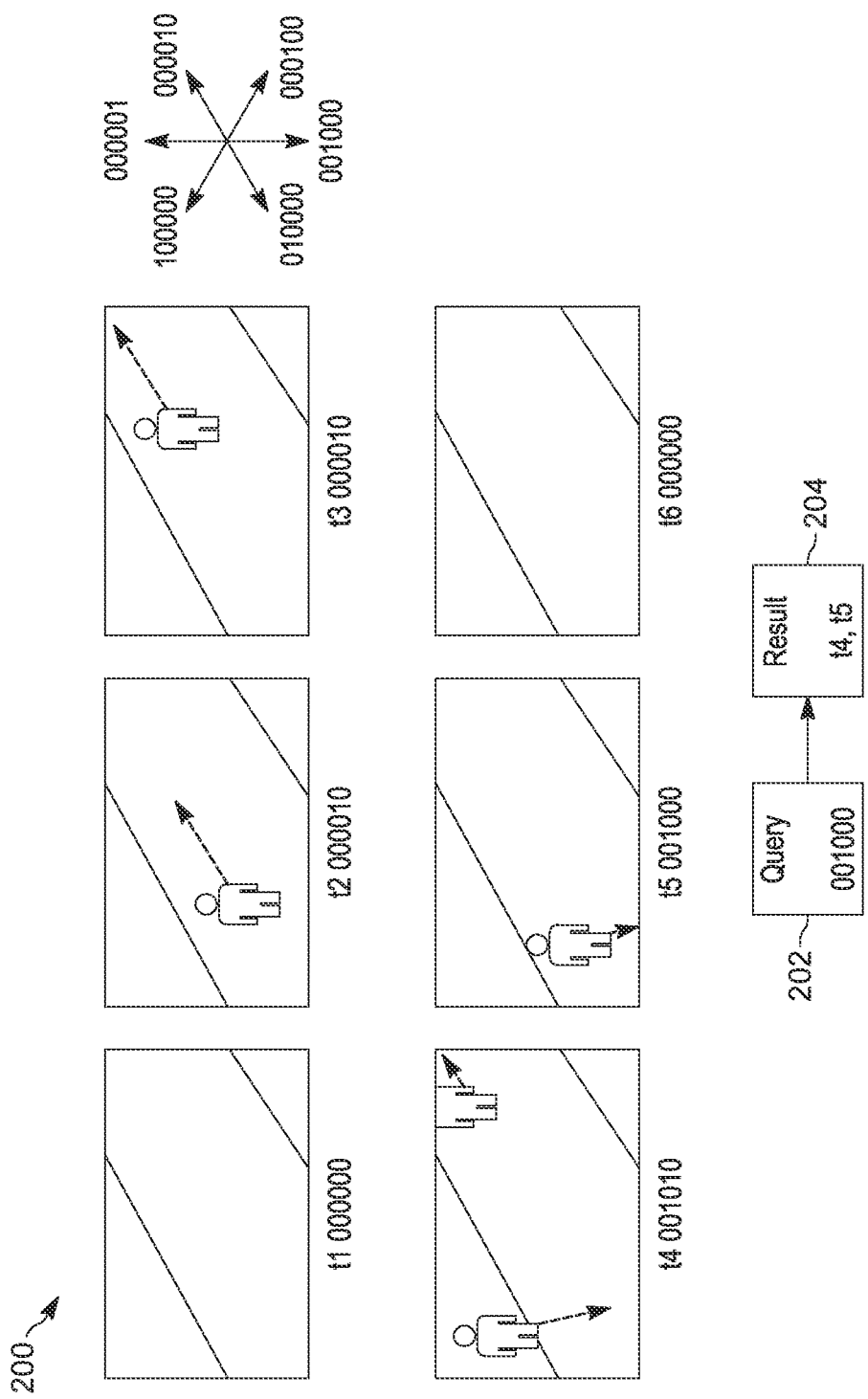
FIG. 2 is a schematic diagram of an example of searching for movement in a video using binary vectors.

FIG. 2 shows a simple illustrative example of searching for movement in a video 200 using binary vectors. Several example frames of a video 200 are shown at different times, t1, t2, etc. which correspond to intervals at which binary vectors are generated. The example may be performed by the systems and method discussed herein, such as the system 100 discussed above.

A binary vector schema for movement in the scene captured by the video 200 may be defined using a 6-bit vector, where each bit represents the presence of movement in a different direction. For example, a binary vector 000001 may represent movement upwards, i.e., movement in a direction between 30 to 60 degrees if 0 degrees is defined as up in the scene. The binary vector 000010 may represent movement in a direction between 60 and 120 degrees, and so on. The binary vector 000000 may represent the absence of movement.

In the example shown, which depicts a street scene, at time t1, no motion is detected, so the representative binary vector for the scene is 000000. At times t2 and t3, a first person moves through the scene in a direction indicated by binary vector 000010. At time t4, the first person is still moving through the scene at a vector of 000010 and a second person is moving downwards at a vector of 001000, giving the scene as a whole a binary vector of 001010. At t5, the first person is gone, and the second person maintains the same direction. At time t6, the scene contains no appreciable movement.

An example query 202 may be constructed to detect movement downwards in the direction of binary vector 001000. Accordingly, a result 204 of the query 202 may identify times t4 and t5 as relevant because both of these segments of the video 200 contain downward movement. That is, the binary vector 001000 is similar to the binary vectors 001010 (t4) and 001000 (t5) and dissimilar to the binary vectors 000000 (t1 and t6) and 000010 (t2 and t3). Using dot product as an example similarity computation, it can be seen that the dot product of the query binary vector 001000 has a value of 1 at times t4 and t5 and a value of 0 at other times.

The query 202 may be created in various ways. For example, the video 200 at time t5 may be selected by a user who wishes to find other instances of downward movement. The user may consider time t5 as representative of what they wish to find. Accordingly, the binary vector 001000 computed for this time may be used as the query 202.

The result 204 may be presented in various forms. For example, intervals of the video 200 around times t4 and t5 may be presented to the user. In another example, icons or symbols may be displayed on a video scrub bar at times t4 and t5, so that the user may conveniently scrub forward or backwards through the video 200 to these times.

The principles discussed above concerning movement apply to other information detected within a video, such as occupancy (i.e., the presence of a number of people), occupancy geometry (e.g., queues and crowds), detection of vehicles and movement thereof, the detection of specific people, and so on. For example, for occupancy, a binary vector schema may use 1 bit to represent a number of people over a threshold (e.g., 20), where 0 represents 19 or fewer people and 1 represents 20 or more people.

Binary vectors representing different event types (e.g., movement, types of object, occupancy, etc.) may be encoded using different types of encodings. Binary vectors representing different types of events may arranged in an array or concatenated into a single binary vector. For example, a 7-bit binary vector may represent movement and occupancy, where the 6 most significant bits represent movement and the least significant bit represents occupancy by 20 people or more. As such, a crowd moving cohesively upward and to the left may be represented by the binary vector 1000001 (see above example schemas), while a crowd dispersing in all directions may be represented by the binary vector 1111111. In other examples, cyclic data may be encoded with overlapping intervals. For example, direction may be encoded with 360 bits each bit representing one degree from 0 to 359, and a given degree value may be encoded as 11 bits centered at the specific degree value, so that nearby degree values have overlapping bits and are thus similar when using dot-product or similar computation. This type of cyclic encoding will be discussed in greater detail below.

Figure 3:
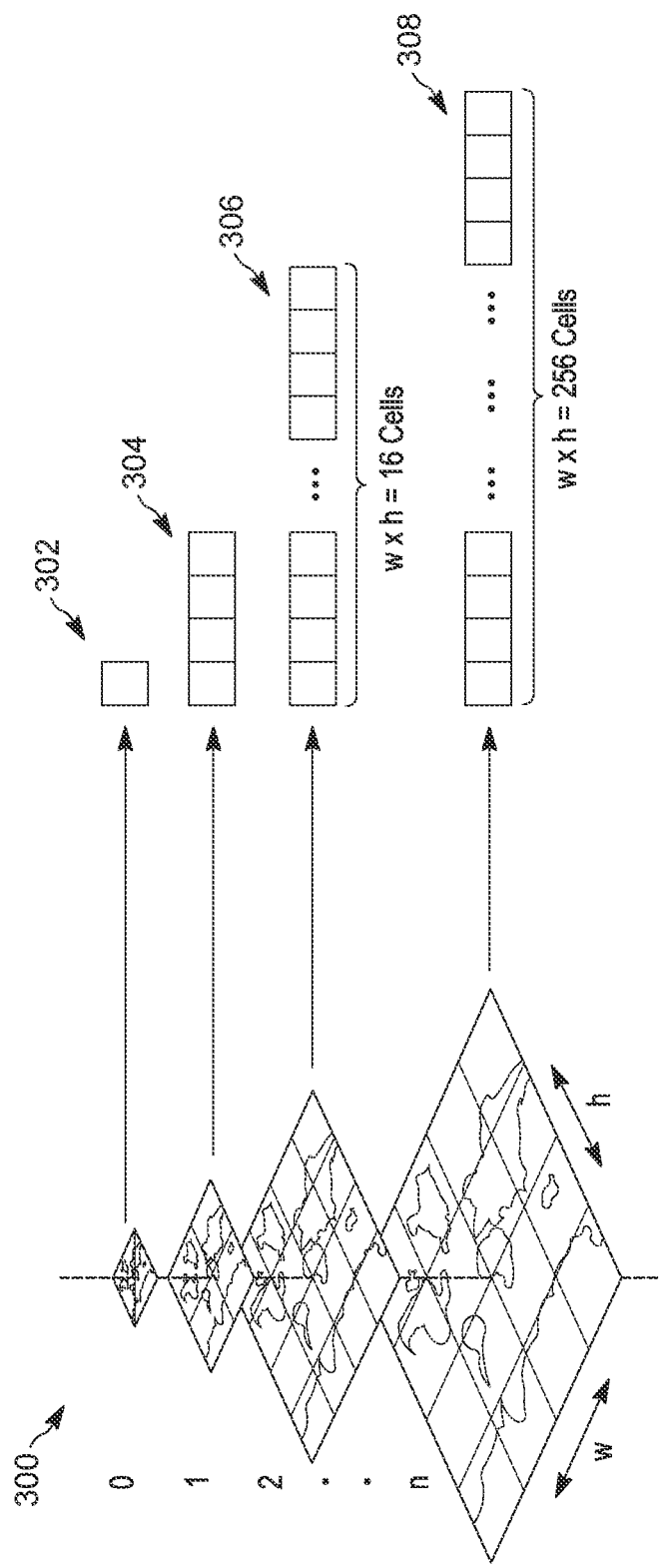
FIG. 3 is a schematic diagram of an example multiscale overlapping grid.

FIG. 3 shows an example multiscale overlapping grid 300 that is useful to add geometric constraints to the techniques discussed herein. The multiscale overlapping grid 300 may be used to manage the spatial dimension of a scene captured by a video.

The multiscale overlapping grid 300 may include multiple grids with different scales. Any number of grids, n, may be provided. In this example, the grids are regular and square. In other examples, other geometries and proportions may be used.

A lowest scale grid (n=0) contains one cell 302 to represent the entire scene. All events in the video occur within this cell 302 and may be represented by a single binary vector for this cell 302. The example of FIG. 2 shows an example of this scale of grid.

Higher scale grids (n=1, 2, etc.) contain a greater number of cells. For example, an array of four cells 304 represents a 2×2 grid, an array of 16 cells 306 represents a 4×4 grid, and an array of 256 cells 308 represents a 16×16 grid. Events in the scene of the video map to different cells at each level of grid.

Figure 4:
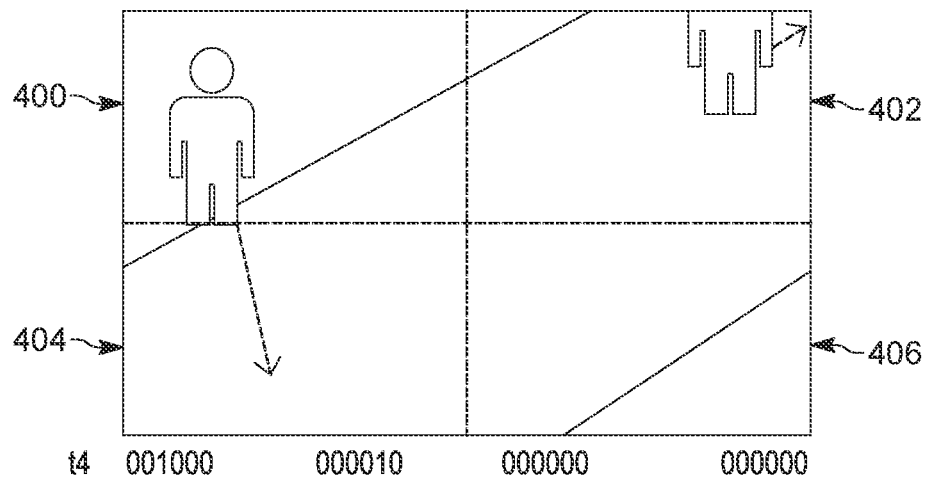
FIG. 4 is a schematic diagram of an example video frame with an example grid applied.

A higher scale grid may be used to specify locations within the scene when searching for events. FIG. 4 shows the video 200 of FIG. 2 at time t4 mapped to a 2×2 grid. Two cells 400, 402 contain movement and two cells 404, 406 do not. Using the above example schema, the binary vectors for the four cells 400, 402, 404, 406 are respectively 001000, 000010, 000000, and 000000.

A query made against this array 304 may be processed for each cell 400, 402, 404, 406. For example, a query vector of 001000 may be compared to the vectors of each cell 400, 402, 404, 406. Such a query would return a positive result for the top left cell 400, indication downward motion in this cell.

As such, a multiscale overlapping grid 300 may be used to specify a degree of geometric precision for a query. Should a user wish to find an event in the video scene as a whole, the lowest scale grid (n=0) that contains one cell 302 may be compared to the query vector, as discussed in the example of FIG. 2. Should the user wish to limit their query to a location within the video scene or wish to determine where in a scene an event occurs, then a higher scale grid (n=1, 2, etc.) that contains an array of cells 304, 306, 308 may be compared to the query vector, as discussed in the example of FIG. 4.

Further, the multiscale overlapping grid 300 may be useful to perform a combined query in an efficient manner. If a user wishes to find the locations in a scene of instances of downward movement, the multiscale overlapping grid 300 may be applied progressively. For example, a lowest scale grid (n=0) may be searched first to identify the intervals in the video that contain such movement. Then, video segments in at these intervals may be searched using a higher scale grid (n=1, 2, etc.) to determine the location of such movement.

Figure 5:
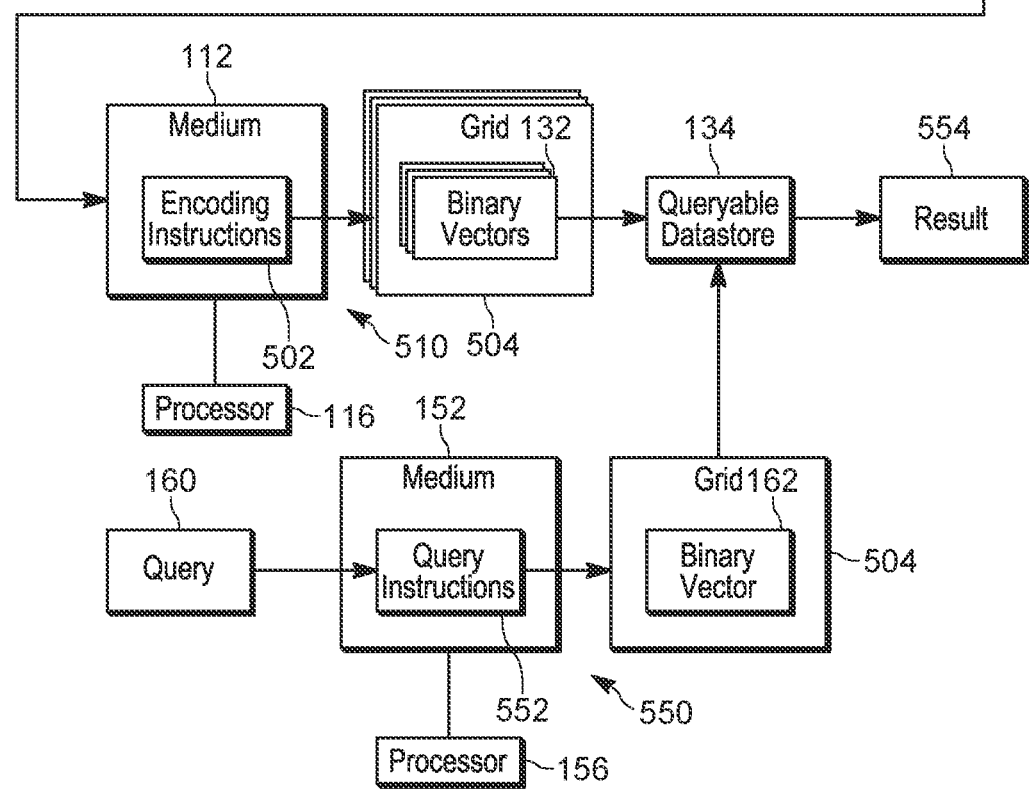
FIG. 5 is a block diagram of an example system for creating searchable video and responding to queries using a multiscale overlapping grid of binary vectors.

FIG. 5 illustrates an example system 500 for creating searchable video and responding to queries using a multiscale overlapping grid of binary vectors. The system 500 may be implemented as an encoding subsystem 510 and a query subsystem 550. The encoding subsystem 510 is similar to the encoding subsystem 110 of FIG. 1. The query subsystem 550 is similar to the query subsystem 150 of FIG. 1. FIG. 1 and related description may be referenced for details not repeated here.

The encoding subsystem 510 includes encoding instructions 502 that generate a grid 504 for a scene of the video 120. The grid 504 may be rectangular, square, or other shape and may have a scale that provides a corresponding number of cells.

For each event 126 being encoded, the encoding instructions 502 determine a cell of the grid 504 that contains the event 126. Metadata 130 that describes an event 126 may specify a region, such as a bounding box, that contains the event 126. The instructions 502 may map a bounding box to a particular cell if the bounding box is completely contained by the cell as well if the bounding box overlaps a boundary of the cell. That is, a bounding box that is partially within a cell may be considered to be contained by that cell. As such, a bounding box may map to multiple cells.

Figure 6:
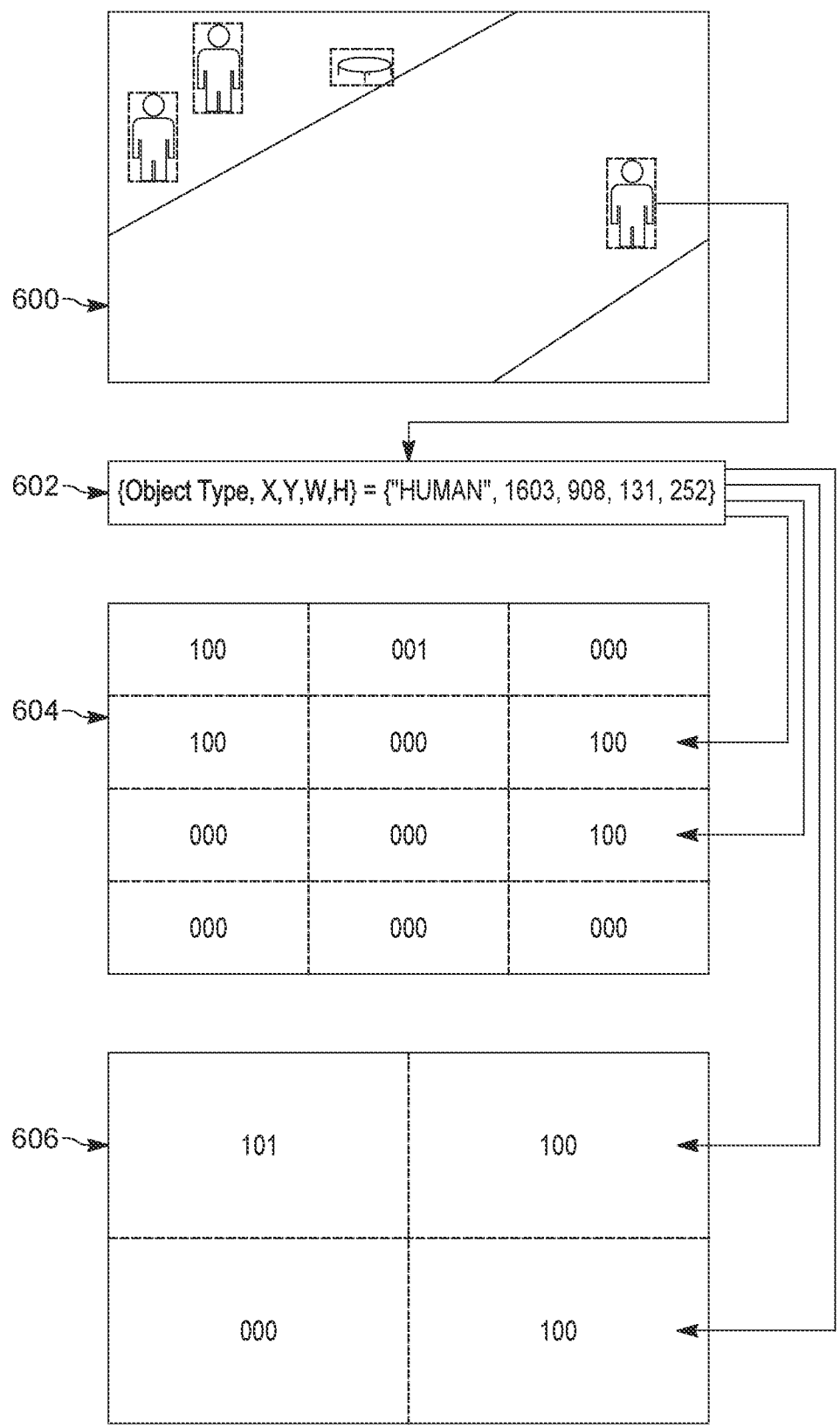
FIG. 6 is a schematic diagram of mapping example metadata of a video to different grids.

FIG. 6 show an example of the encoding instructions 502 mapping metadata 602 of a video 600 to a fine-scale grid 604 and a coarser grid 606. In this example, the grid 604 is 3-by-4 and the coarser grid is 2-by-2. As shown, a multiscale overlapping grid may have grids with scales that do not necessarily align with each other. In this example, metadata 602 indicates a type of object detected as well as the bounding box in terms of X-Y position within the scene and height and width, in pixels. Accordingly, a binary vector schema may be established as a 3-bit schema that has bits for human (100), vehicle (010), and other objects (001). The encoding instructions 502 map the metadata 602 to the cells of the grids 604, 606. As can be seen, in the coarser grid 606, the rightmost cells have binary vectors that signify the presence of a person (100), and the finer-scale grid further specifies the location of the person to the middle rightmost cells.

With reference back to FIG. 5, the encoding instructions 502 generate a set of binary vectors 132 for the cells of the grid 504, as discussed above. A binary vector 132 may be generated for each cell of the grid 504 to encode an event 126 or lack thereof for the cell.

The grid 504 may be a multiscale overlapping grid. As such, the encoding instructions 502 may generate different subsets of binary vectors 132 for different scales of the multiscale overlapping grid.

The query subsystem 550 is responsive to queries made against the set of binary vectors 132 as associated with the grid 504, whether a simple grid or a multiscale overlapping grid. The query subsystem 550 includes query instructions 552 configured to process a query binary vector 162 with reference to the grid 504 to obtain a result 554.

The query instructions 552 may be configured to generate a result 554 that indicates an interval of the video that contains an event similar to the event of interest defined by the query binary vector 162, as discussed above. As such, the user may control the scrubber to view the video 120 at this interval to see the result.

The query instructions 552 may be further configured to generate a result 554 that indicates a cell of the grid 504 that contains the event 126 that is subject of the query 160. With reference to FIG. 6, a query that specifies an object type of "human" would return cells that have a binary vector that have a value of 1 as the most-significant bit. Cells may be returned as cell identifiers or locations within video 600 and may be highlighted in the video 600 using an icon, box, or other marker.

A query 160 may specify a target grid scale and the query instructions 552 may be configured to execute the query by comparing the binary vector 162 to a subset of binary vectors associated with the target scale. A particular grid of a multiscale overlapping grid may be selected. As such, the query 160 need not be processed against grids of other scales.

Of course, with reference back to FIG. 1, in addition to the spatial dimension addressed by the grid 504, the temporal dimension may also be considered by the query instructions 552. The result 554 may indicate an interval of the video 120 during which the queried event 126 takes place.

Figure 7A:
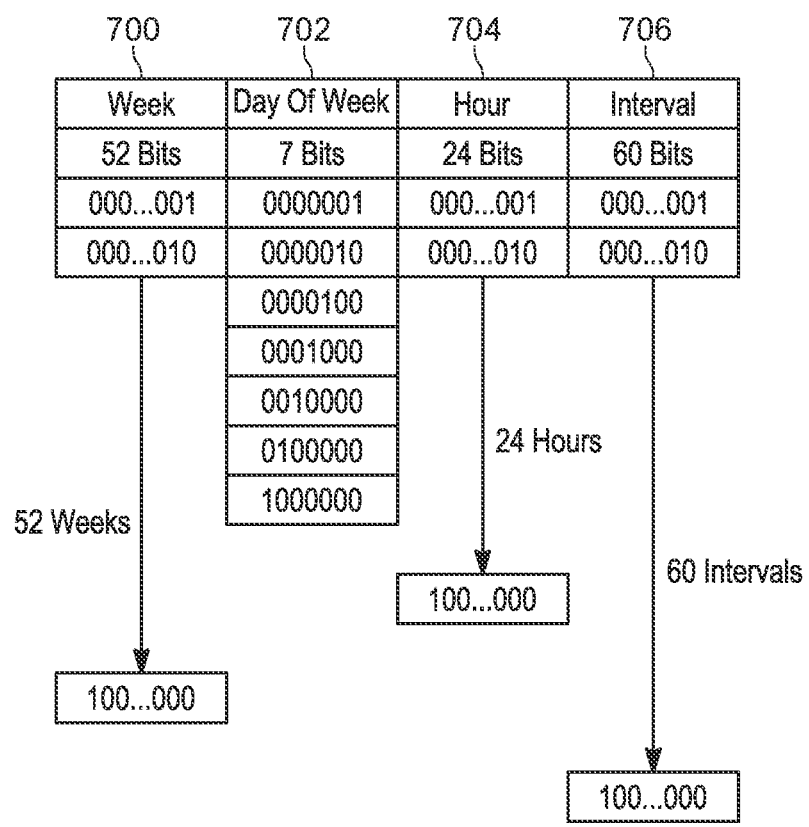
FIG. 7A is a schematic diagram of example timestamp encoding.

With reference to FIG. 7A, timestamps of a video may be encoded using cyclic encoding. Encoding instructions 114, 502 may convert a standard timestamp (e.g., YYYY-MM-DD hh:mm:ss) for an interval of the video into a cyclic timestamp composed of binary vectors. For example, the week 700 may be stored as a binary vector of 52 bits, the day of week 702 may be stored as a binary vector of 7 bits, the hour 704 may be stored as a binary vector of 24 bits, and the interval 706 within the hour may be stored as a binary vector with a number of bits appropriate for the length of interval used. If the interval is 60 seconds, then a 60-bit vector may be used. As with the other binary vectors discussed herein, these are one-hot vectors useful for efficient comparison such as by computing dot products.

When the query instructions 154, 552 determine that the query indicates a time, the query may further be encoded with reference to the cyclic encoding. Comparison of similarity may then be performed on the basis of cyclic time.

For example, day-of-week encoding may specify Monday, Tuesday, Wednesday, Thursday, Friday, Saturday, and Sunday as being represented by binary vectors 0000001, 0000010, 0000100, 00010000, 0010000, 0100000, 1000000, respectively. A query may indicate Tuesday as a day of interest and hence the query may be converted to include the vector 0000010.

With reference to FIGS. 7B and 7C, timestamps of a video may be encoded using another form of cyclic encoding that provides for matches with similarity. While the encoding of FIG. 7A provides for discrete matches (e.g., Tuesday matches a Tuesday, but not a Monday or Wednesday), the encoding of FIGS. 7B and 7B can provide similarity in matching.

As shown in FIG. 7B, a particular time within a period, such as a week 720, is mapped to a number of bits (e.g., five bits), while a particular interval within the period, such as a day, is mapped to fewer bits (e.g., three bits). The mappings of adjacent intervals overlap, such that adjacent intervals share bits. In the example depicted, an encoding describes eight hours with one bit, so that a week having 168 hours would have 21 bits and encodes a particular time within the week using five contiguous bits.

The nominal encoding 722 for Tuesday contains five bits centered at Tuesday at noon and, due to the number of bits being larger than the period, the bits overlap with bits of Monday and Wednesday. Tuesday may thus be encoded as five bits that cover all three eight-hour segments of Tuesday and that extend eight hours into each of Monday and Wednesday. The example encoding 724 describes the last portion of Tuesday and thus, when dot-product similarity is used, would have greater similarity to Wednesday than to Monday. The example encoding 726 describes early Wednesday morning and thus has similarity to Tuesday afternoon and evening. Likewise, the example encoding 728 describes early Tuesday morning and thus has greater similarity to Monday than to Wednesday.

As can be seen in FIG. 7C, this type of cyclic encoding may be used for other periods such as a day 730 divided into intervals of one hour. Each hour may be described by, for example, six bits centered at the top of the hour with each bit representing a 10-minute segment. The example encoding 732 describes a time from 9:55 PM to 10:05 PM and is more similar to the example encoding 734 (10:25 PM to 10:35 PM) than to the example encoding 736 (9:05 PM to 9:15 PM).

Generally, this type of cyclic encoding divides a period into a number of bits and uses a contiguous sequence of bits to describe a time within that period, so that the interval of interest within the period has fewer bits than the contiguous sequence, thereby providing for overlap among adjacent intervals. This type of cyclic encoding may also be used for direction of movement and other forms of metadata where similarity expected. Applying this cyclic encoding to the example of FIG. 2, upwards may be described as 100011, which is similar to up and to the right (000111) but not similar to downwards (011100).

FIG. 8 shows an example binary vector encoding 800 for events of a video using the techniques discussed above. Each interval 802 of the video has its time dimension quantified as a cyclic timestamp that may record the week. W, day, D, hour, H, and interval, i, as respective binary vectors. Each interval 802 may have its spatial dimension (i.e., field of view or scene of the video) quantified as a multiscale overlapping grid having a number, n, of grids of different scales, where each grid has a respective width, w, in cells and height, d, in cells. Each cell of each grid has events contained in that cell quantified as an array of a number, m, of binary vectors, T, corresponding to different event types, each with their own encoding.

The binary vectors for a particular interval 802 may be concatenated. For example, a given interval may be represented by a concatenation of [W][D][H][i] followed by [T1][T2] . . . [Tm] for each cell of each grid. When consistent concatenation is maintained, a large binary vector results. Each bit represents an aspect of the interval 802 and the bit at the same location of each interval 802 represents the same aspect. A sequence of intervals, such as an entire video file or stream, may be indexed in this way.

The encoding 800 may also be used to form queries. A query may take the same or similar format as an interval 802. The query may be processed by performing a similarity function, such as a dot product, with the query against each interval.

Figure 9:
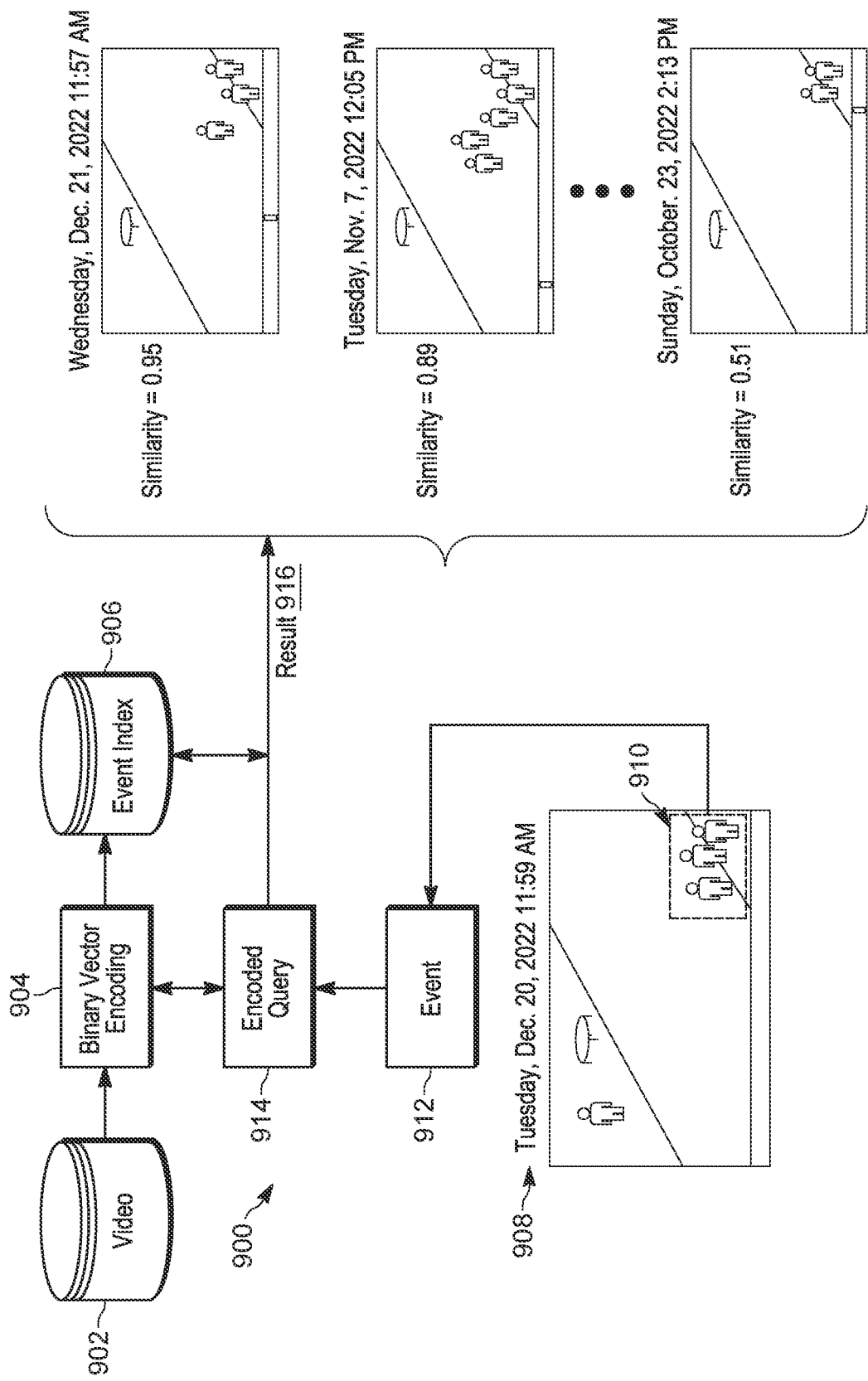
FIG. 9 is a schematic diagram of example system for searching a video using binary vector encoding.

FIG. 9 shows an example system 900 for searching a video using binary vector encoding. The techniques discussed above may be used to implement the system 900.

Video 902 is captured and processed using binary vector encoding 904 discussed above. An event index 906 is created and stored in association with the video 902. For example, each interval of video 902 may be processed as discussed above with respect to FIG. 8 and a sequence of encoded intervals may be stored as an event index 906.

A user viewing the video 902 on their screen may highlight an event 910 of interest using a GUI, for example, by drawing a box around an event 910 of interest. The event 910 may be indicated in the temporal dimension 908 (e.g., normal timestamp) and spatial dimension (e.g. box on screen).

The event 910 is then encoded using the binary vector encoding to form an encoded query 914. The encoded query 914 describes the event 910 in the same encoding as the event index 906 describes the video 902.

The encoded query 914 is the executed by performing a similarity computation with the event index 906. A dot product may be computed with the encoded query 914 and each interval represented by the event index 906. The result 916 may include a similarity value for each interval of the event index 906 with a respective interval or sequence of intervals from the video 902. These may be presented in various forms, such as a ranked list of similar video snippets.

In view of the above, it should be apparent that efficient searching of video may be realized using binary vectors that describe events within the video.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot search video with binary vectors, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising." "has", "having." "includes", "including." "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a". "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A non-transitory machine-readable medium comprising instructions that, when executed by a processor, cause the processor to:

receive metadata describing an event that is detected within video captured by a camera;
generate a grid for a scene of the video, wherein the grid comprises a multiscale overlapping grid, wherein the multiscale overlapping grid includes multiple grids with different scales, and wherein each of the multiple grids represents an entirety of the scene of the video;
determine respective cells, of the multiple grids of the multiscale overlapping grid, that contain the event;
encode the event as a binary vector;
generate sets of respective binary vectors for the multiple grids, the sets of the respective binary vectors each including the binary vector encoding the event for a respective cell that contains the event, and wherein other binary vectors of the respective binary vectors indicate that associated cells are lacking the event;
associate the sets of the respective binary vectors with respective multiple grids of the multiscale overlapping grid;
store the sets of the respective binary vectors in a queryable datastore;
receive a query to find a given event, similar to the event, within the video;
encode the query as a query binary vector representative of the given event;
compare the query binary vector to the sets of the respective binary vectors; and
when the query binary vector is similar to the binary vector found in the sets of the respective binary vectors, identify the respective cells of the multiple grids that contain the event,
wherein when the event is found in a first multiscale grid that includes only one cell, the scene of the video is determined to include the event, and
wherein when the event is found in a second multiscale grid that includes a plurality of cells, the event is identified in a respective region of the scene of the video that includes the respective cell associated with the respective binary vector.

2. The non-transitory machine-readable medium of claim 1, wherein the instructions are further to generate the sets of respective binary vectors over an interval of the video.

3. The non-transitory machine-readable medium of claim 2, wherein the instructions are further to:
determine timestamps for the interval of the video using cyclic encoding; and
encode the timestamps as binary vectors within the sets of respective binary vectors.

4. The non-transitory machine-readable medium of claim 1, wherein:
the metadata describes different event types within the video; and
the sets of respective binary vectors includes subsets for the different event types.

5. The non-transitory machine-readable medium of claim 4, wherein the subsets are encoded with different encodings.

6. A non-transitory machine-readable medium comprising instructions that, when executed by a processor, cause the processor to:
receive a query to find an event within video;
encode the query as a query binary vector representative of the event;
compare the query binary vector to sets of respective binary vectors generated for the video to find similar events,
wherein a scene of the video is associated with a grid, wherein the grid comprises a multiscale overlapping grid,
wherein the multiscale overlapping grid includes multiple grids with different scales, and each of the multiple grids represents an entirety of the scene of the video,
wherein the sets of respective binary vectors are respectively associated with the multiple grids,
wherein the sets of the respective binary vectors each include a respective binary vector encoding a given event, similar to the event, for a respective cell that contains the given event, and wherein other binary vectors of the respective binary vectors indicate that associated cells are lacking the event; and
return a result indicative of a similarity of the query binary vector to one or more respective binary vectors of the sets of respective binary vectors,
wherein the instructions are further to:
when the query binary vector is similar to the respective binary vector found in the sets of the respective binary vectors, identify the respective cells of the multiple grids that contain the event,
when the event is found in a first multiscale grid that includes only one cell that includes the entirety of the scene of the video, the result indicates that the entirety of the scene of the video includes the event, and
when the event is found in a second multiscale grid that includes a plurality of cells, the result indicates that the event is identified in a respective region of the scene of the video that includes the respective cell associated with the respective binary vector.

7. The non-transitory machine-readable medium of claim 6, wherein:
the instructions are further to determine a target scale from the query; and
the instructions are further to compare the query binary vector to a subset of the sets of respective binary vectors associated with the target scale.

8. The non-transitory machine-readable medium of claim 6, wherein:
the sets of respective binary vectors spans intervals of the video; and
the instructions are further to generate the result to indicate an interval of the video that has the event.

9. The non-transitory machine-readable medium of claim 6, wherein:
the sets of respective binary vectors includes timestamps encoded as binary vectors using cyclic encoding; and
when the query indicates a time, the instructions are further to encode the query as the query binary vector using the cyclic encoding.

10. The non-transitory machine-readable medium of claim 6, wherein:
the sets of respective binary vectors includes subsets associated with different event types within the video; and
when the query indicates a type of the event, the instructions are further to compare the query binary vector to a respective subset of the sets of respective binary vectors.

11. A non-transitory machine-readable medium comprising instructions that, when executed by a processor, cause the processor to:
generate a set of binary vectors representative of events detected within a video;

wherein each binary vector is associated with a spatial dimension, a temporal dimension, or the spatial and temporal dimensions of the video;

wherein different subsets of the set of binary vectors are associated with different scales of a multiscale overlapping grid defined for a scene of the video, and wherein the multiscale overlapping grid includes multiple grids with different scales, and wherein each of the multiple grids represents an entirety of the scene of the video, wherein each of the different subsets includes a respective binary vector representing a given event for a respective cell that contains the given event, and other binary vectors of each of the different subsets indicate that associated cells are lacking the given event, wherein when a first multiscale grid includes only one cell, the first multiscale grid is for determining that an entirety of the scene of the video includes the given event, and wherein when a second multiscale grid includes a plurality of cells, the second multiscale grid is for determining a respective region of the scene of the video that includes the respective cell, associated with the respective binary vector, that includes the given event.

12. The non-transitory machine-readable medium of claim 11, wherein different subsets of the set of binary vectors include cyclically encoded timestamps of the video.

13. The non-transitory machine-readable medium of claim 11, wherein different subsets of the set of binary vectors are associated with different types of events detected within the video.

14. The non-transitory machine-readable medium of claim 11, wherein the instructions are further to:
compute a similarity between a querying binary vector and the set of binary vectors; and
output an indication of the similarity.

15. The non-transitory machine-readable medium of claim 14, wherein the indication of the similarity indicates a position of the querying binary vector within the set of binary vectors in the spatial dimension, the temporal dimension, or the spatial and temporal dimensions.

* * * * *